US012667061B1

(12) United States Patent
Mosley

(10) Patent No.: US 12,667,061 B1
(45) Date of Patent: Jun. 30, 2026

(54) LANDSCAPING BARRIER

(71) Applicant: Justin D. Mosley, Holly Ridge, NC (US)

(72) Inventor: Justin D. Mosley, Holly Ridge, NC (US)

( * ) Notice: Subject to any disclaimer, the term of this patent is extended or adjusted under 35 U.S.C. 154(b) by 3 days.

(21) Appl. No.: 18/431,376

(22) Filed: Feb. 2, 2024

(51) Int. Cl.
*A01G 13/30* (2025.01)
*A01G 13/32* (2025.01)
*A01G 13/37* (2025.01)

(52) U.S. Cl.
CPC ............. *A01G 13/32* (2025.01); *A01G 13/30* (2025.01); *A01G 13/37* (2025.01)

(58) Field of Classification Search
CPC ......... A01G 13/30; A01G 13/32; A01G 13/37
USPC .......................................... 47/32, 32.7, 32.8
See application file for complete search history.

(56) References Cited

U.S. PATENT DOCUMENTS

| | | | | |
|---|---|---|---|---|
| 3,870,583 A | * | 3/1975 | Gidge | ..................... B32B 13/14 |
| | | | | 428/17 |
| 4,239,824 A | * | 12/1980 | Kasten | ................... A01G 13/32 |
| | | | | 428/323 |
| 4,659,602 A | | 4/1987 | Birch | |
| 5,525,416 A | | 6/1996 | Katz et al. | |
| 6,233,867 B1 | * | 5/2001 | Gibson | ................... C05G 5/16 |
| | | | | 47/32.7 |

| | | | | |
|---|---|---|---|---|
| 6,443,667 B2 | | 9/2002 | Brown | |
| 7,082,713 B1 | * | 8/2006 | Buhrman | ............... C09K 17/52 |
| | | | | 47/21.1 |
| 7,470,458 B1 | | 12/2008 | Loo | |
| 8,935,882 B2 | * | 1/2015 | Hawkinson | ........ A01G 13/0268 |
| | | | | 47/9 |
| 9,119,351 B1 | | 9/2015 | Campbell | |
| 10,448,580 B1 | | 10/2019 | Borras | |
| 11,744,194 B2 | * | 9/2023 | Lortscher | ............... A01G 13/32 |
| | | | | 47/21.1 |
| 2004/0200140 A1 | | 10/2004 | Alexander | |
| 2008/0085382 A1 | | 4/2008 | Erickson et al. | |
| 2009/0145055 A1 | | 6/2009 | Remke et al. | |
| 2009/0158646 A1 | * | 6/2009 | Moore, Jr. | .............. B32B 25/14 |
| | | | | 156/60 |
| 2016/0097182 A1 | * | 4/2016 | Golden | ................... A01G 13/38 |
| | | | | 405/302.7 |
| 2018/0332781 A1 | | 11/2018 | Dougherty | |
| 2023/0160153 A1 | * | 5/2023 | Kessler | .................... B05D 1/02 |
| | | | | 404/82 |

* cited by examiner

*Primary Examiner* — David J Parsley
(74) *Attorney, Agent, or Firm* — Cramer Patent & Design, PLLC.; Aaron R. Cramer

(57) ABSTRACT

The landscaping barrier may comprise a plurality of barrier sections that may be positioned within a landscaped area to form a weed barrier. The plurality of barrier sections may prevent weeds from growing within the landscaped area. An individual barrier section selected from the plurality of barrier sections may comprise multiple layers that provide weight and make the individual barrier section impervious to the weeds. In some embodiments, the plurality of barrier sections may comprise non-uniform sizes and shapes such that the plurality of barrier sections may be selected and positioned to cover the landscaped area regardless of the size and shape of the landscaped area.

1 Claim, 5 Drawing Sheets

100

210

240

242

206

100

100

272

286

200

900

100

274

900

912

288

200

100

LANDSCAPING BARRIER

RELATED APPLICATIONS

None.

FIELD OF THE DEVICE

The present invention pertains to the field of landscaping and ground maintenance, specifically to an innovative system for creating barriers in landscaped areas to prevent weed growth while conforming to various terrain shapes and configurations.

BACKGROUND OF THE DEVICE

Traditionally, weed control in landscaped areas has relied heavily on chemical treatments or labor-intensive removal processes. Existing physical weed barriers, such as plastic sheets or organic mulches, often fail to provide a durable and adaptable solution, particularly in areas of complex geometry or around existing vegetation like tree trunks. This invention enhances the state of the art by introducing a modular, layered barrier system that is both effective in weed suppression and versatile in application. Its unique design comprising multiple, configurable sections, each with a specialized filler for weight and weed prevention, represents a significant improvement over traditional methods.

SUMMARY OF THE DEVICE

Embodiments of the present disclosure may include a landscaping barrier for suppressing weed growth in landscaped areas, including a plurality of barrier sections, each barrier section configurable to form part of a continuous weed barrier with each barrier section including a top containment layer and a bottom containment layer, both layers made of durable landscape fabric. Embodiments may also include a middle layer enclosed between the top and bottom containment layers, the middle layer including a granular anti-vegetation filler. Embodiments may also include a perimeter seam sealing the top and bottom containment layers, forming a hollow interior housing the middle layer.

In some embodiments, the top and bottom containment layers may be composed of a material selected from the group consisting of woven and non-woven polyester, polypropylene, linen, recycled materials, or any combination thereof, providing resistance to degradation and weathering. In some embodiments, the granular filler of the middle layer may include pea gravel, crushed stone, or any eco-friendly, non-toxic material, chosen for its weight, flexibility, and permeability.

In some embodiments, the seam may be constructed using techniques selected from the group consisting of heat welding, adhesive bonding, and double or triple stitching, ensuring a durable and weather-resistant bond. In some embodiments, the plurality of barrier sections includes a range of geometric shapes, such as squares, rectangles, L-shapes, triangles, and arc sections, each shape designed to allow for customizable arrangement and coverage of various landscaped area configurations.

In some embodiments, the arc sections may be further classified into exterior arc sections and interior arc sections, the former for creating curved outer borders and the latter for encircling objects such as tree trunks or garden fixtures. Embodiments may also include adjacent barrier sections may be designed to overlap at their borders. In some embodiments, the border of a first barrier section overlays on top of a second barrier section and beneath a third barrier section, creating a shingled effect to ensure continuous coverage and minimize weed penetration.

In some embodiments, the anti-vegetation filler may be designed to block sunlight effectively, while allowing air and water to permeate, thus maintaining soil health beneath the barrier. In some embodiments, the landscaping barrier, further characterized by precise dimensional specifications. In some embodiments, each barrier section measures 13 inches by 13 inches with a border width of 1 inch and a thickness of % inch, with manufacturing tolerances of ±inch for dimensions and ±1/16 inch for thickness. Embodiments may also include 10 A method of installing the landscaping barrier of claim 1, involving laying out the plurality of barrier sections over a landscaped area.

Embodiments may also include arranging the sections in a desired pattern or configuration, ensuring that the borders of adjacent sections overlap to form a continuous barrier. Embodiments may also include optionally covering the installed barrier sections with a top layer of aesthetic ground cover such as mulch, pine straw, or decorative stones to integrate the barrier into the landscape visually.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
FIG. 1 is a top view of a landscaping barrier 100, according to an embodiment of the present invention.
Figure 1:
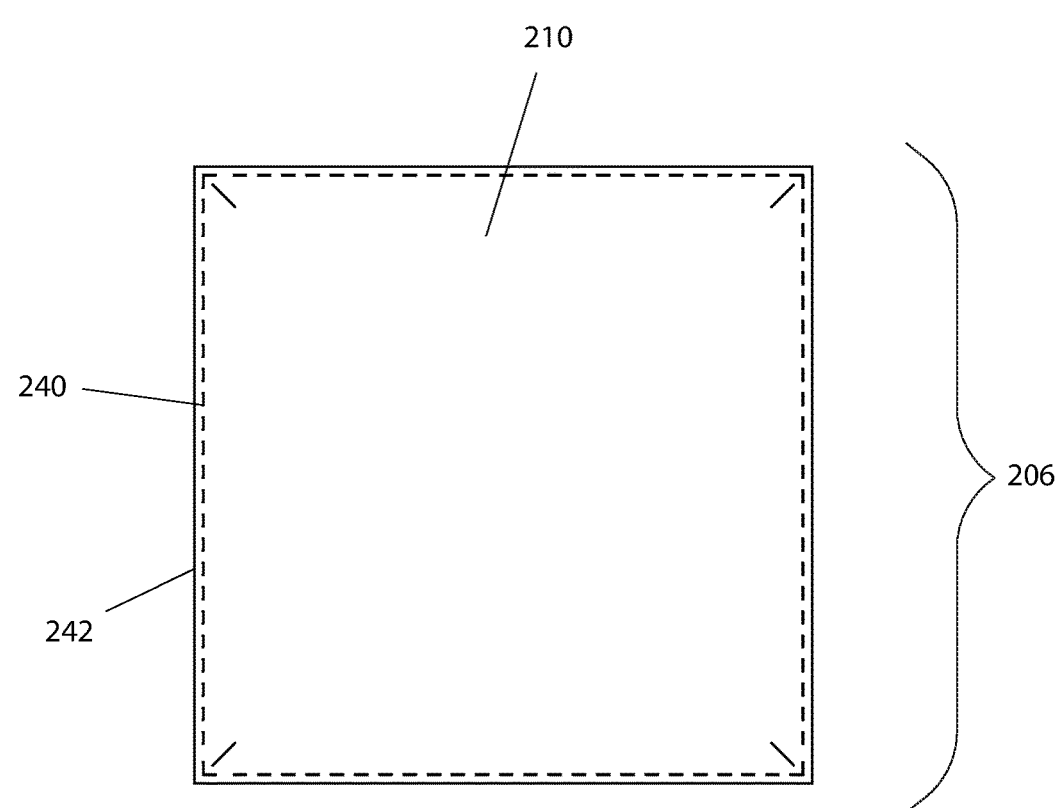
Figure 2:
FIG. 2 is an isometric detail view of a landscaping barrier 100, according to an embodiment of the present invention.
Figure 2:
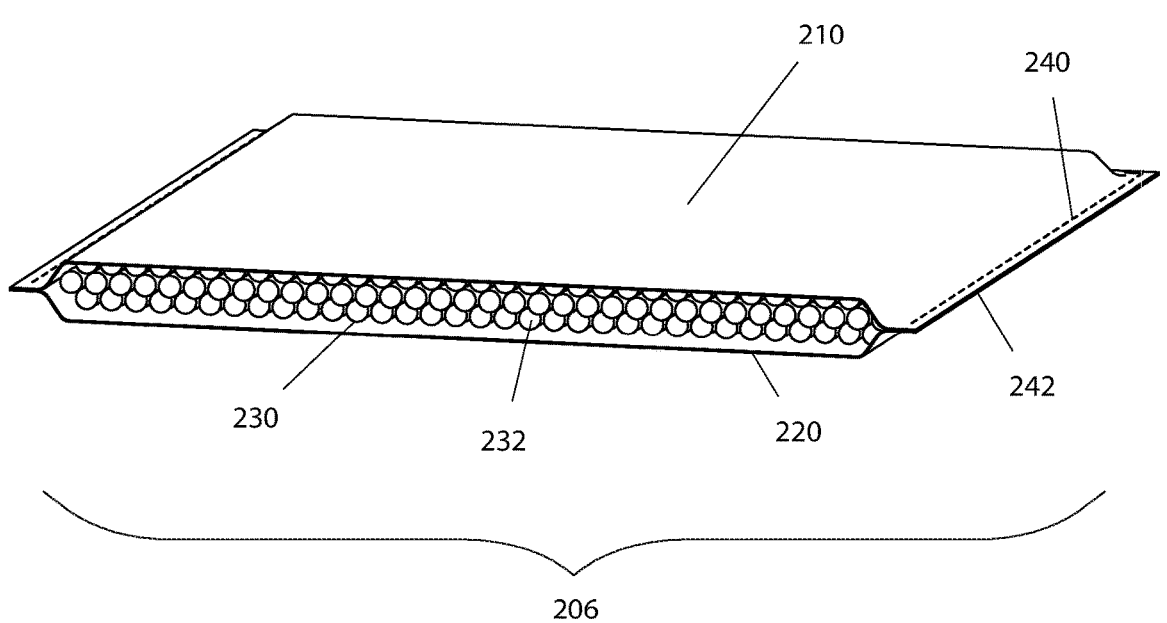
Figure 3:
FIG. 3 is an in-use view of a landscaping barrier 100, according to an embodiment of the present invention, illustrating a plurality of barrier sections 200 comprising a curved outer border 272.
Figure 4:
FIG. 4 is an in-use view of a landscaping barrier 100, according to an embodiment of the present invention, illustrating a plurality of barrier sections 200 comprising an aperture 274 for a tree trunk 912; and, FIG. 5 is a side detail view of a landscaping barrier 100, according to an embodiment of the present invention.
Figure 4:
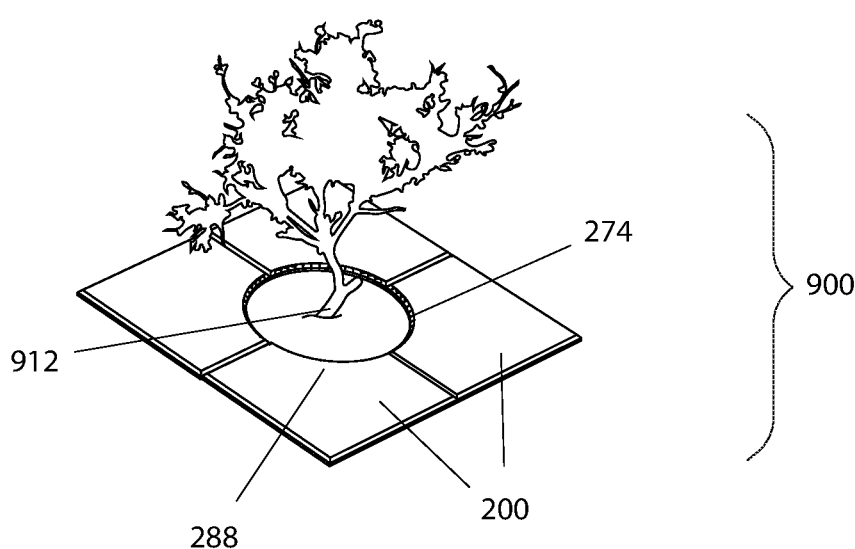
Figure 5:
Figure 5:
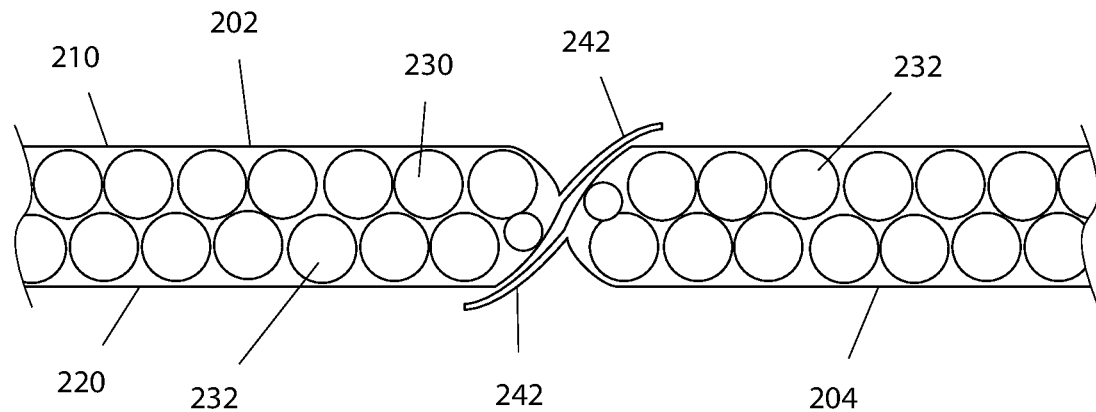

DESCRIPTIVE KEY 100 landscaping barrier
200 plurality of barrier sections
202 first individual barrier section
204 second individual barrier section
206 individual barrier section
210 top containment layer
220 bottom containment layer
230 middle layer
232 anti-vegetation filler
240 seam
242 border
272 curved outer border
274 aperture
286 exterior arc section
288 interior arc section
900 landscaped area
912 tree trunk

What is claimed is:

1. A landscaping barrier consisting of a plurality of barrier sections, each barrier section consisting of:

a top containment layer and a bottom containment layer, each made of landscape fabric consisting of linen or recycled materials;

a middle layer consisting of pea gravel located within a hollow interior defined between the top containment layer and the bottom containment layer; and, a perimeter seam consisting of two parallel rows of stitches that join the top containment layer to the bottom containment layer along an outer border of each barrier section, the border being a fabric-to-fabric region devoid of the middle layer;

wherein each barrier section has dimensions of thirteen inches by thirteen inches with a border width of one inch and a thickness of three-eighths inch, with manufacturing tolerances of ±one-quarter inch for length and width and ±one-sixteenth inch for thickness;

wherein the plurality of barrier sections consists of: (i) square barrier sections, each having four straight sides; (ii) exterior arc barrier sections, each having at least one convex arcuate edge; and (iii) interior arc barrier sections, each having at least one concave arcuate edge;

wherein the plurality of barrier sections is installed on top of a landscaped surface such that a border of a first barrier section overlaps on top of a border of a second barrier section and is positioned beneath a border of a third barrier section, with the middle layer of the first barrier section and the middle layer of the second barrier section being contiguous to minimize any gap in the pea gravel between the first barrier section and the second barrier section; and, wherein the exterior arc barrier sections collectively define a curved outer border of the landscaping barrier and the interior arc barrier sections collectively define a closed aperture sized to encircle a tree trunk.

* * * * *